United States Patent [19]

Ohmura et al.

[11] Patent Number: 5,664,235
[45] Date of Patent: Sep. 2, 1997

[54] PORTRAIT PHOTOGRAPHY CAMERA AND METHOD

[75] Inventors: Hiroshi Ohmura; Masaharu Kanai; Mahito Shimizu, all of Tokyo, Japan

[73] Assignee: Fuji Photo Film Co., Ltd., Kanagawa, Japan

[21] Appl. No.: 92,740

[22] Filed: Jun. 15, 1993

[30] Foreign Application Priority Data

Jun. 15, 1992 [JP] Japan ................................ 4-155463

[51] Int. Cl.⁶ .......................... G03B 13/04; G03B 17/20
[52] U.S. Cl. ........................ 396/71; 396/147; 396/148; 396/290; 396/378
[58] Field of Search ............................ 354/219, 221, 354/222, 162, 163, 166, 167, 465, 471, 474, 475, 195.1, 195.12, 195.13, 199; 396/71, 72, 80, 84, 89, 103, 147, 148, 281, 287, 290–292, 296, 373, 378, 384, 385

[56] References Cited

U.S. PATENT DOCUMENTS

| | | | |
|---|---|---|---|
| 3,102,459 | 9/1963 | Zimberoff | 354/105 |
| 4,697,901 | 10/1987 | Wakabayashi et al. | 354/221 |
| 4,984,001 | 1/1991 | Himuro | 354/195.12 |
| 5,019,854 | 5/1991 | Mukai et al. | 354/471 |
| 5,111,223 | 5/1992 | Omura | 354/195.12 X |
| 5,257,055 | 10/1993 | Cho et al. | 354/222 |

FOREIGN PATENT DOCUMENTS 3412674 10/1984 Germany.
3637742 5/1988 Germany.

OTHER PUBLICATIONS 63-186222, Aug. 1988, Patent Abstract of Japan.

Primary Examiner—Safet Metjahic
Assistant Examiner—J. K. Han
Attorney, Agent, or Firm—Young & Thompson

[57] ABSTRACT

A portrait photograph camera incorporates a taking lens assembly having a predetermined focal length, and photographs a human head on instant film. A pair of indicia are displayed within a field frame of a viewfinder. According to the indicia, the human head is framed or targeted. The framed human head is photographed, so as to create an image having a predetermined size range on the film. In a preferred embodiment, a telephoto converter lens is selectively mountable on the taking lens. Combined with the telephoto converter, the taking lens has a longer focal length. A second pair of indicia are displayed within the finder field frame. The human head as framed by the second indicia is photographed at the longer focal length so as to create on the film an image in the former predetermined size range. A rangefinding device measures the subject distance. When the subject distance is too great for photography through the taking lens without a converter lens, a telephoto indicator lamp displays in the viewfinder an instruction to mount the telephoto converter lens on the taking lens assembly. Another converter lens, with its associated indicia, is provided to shorten the focal length for wide-angle photography.

3 Claims, 7 Drawing Sheets

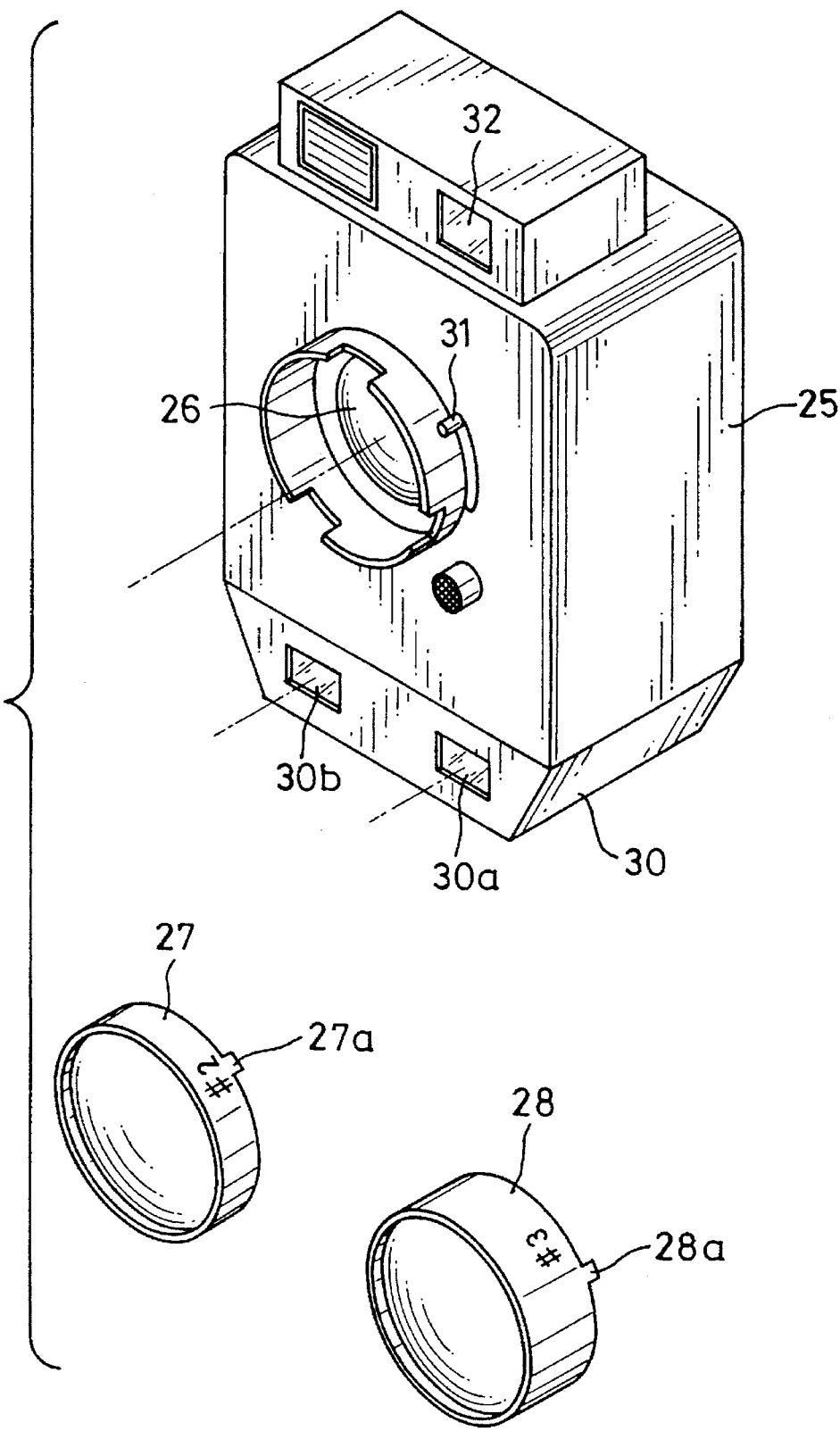

PORTRAIT PHOTOGRAPHY CAMERA AND METHOD

BACKGROUND OF THE INVENTION

1. Field of the Invention

The present invention relates to a portrait photography camera and method, more particularly to a portrait photography camera and method easily capable of making a portrait such that the image of a human head is shown in a desired manner.

2. Description of the Prior Art

A driver's license or a passport is issued to an applicant only after attachment of his or her portrait photograph. The portrait shows the applicant's facial appearance and is used for visually identifying an owner of the license or passport as the applicant. It is usual to attach portrait photographs to the licenses, passport, or any other article or document which it is intended will exhibit recorded data needing to be safeguarded against unlawful alteration. There are generally used cameras designed for taking such ID portraits.

When the ID portrait camera is an instant camera, instant film units are used. On the photograph made from an instant film unit, the reproduced size of the head is dependent only on the magnification. An ID portrait camera can also be a camera for use with negative film, which is exposed, developed and printed. If the negative film is subjected to contact printing, the reproduced size of the head is dependent not only on the photographic magnification but also on the magnification during printing. With either camera, a photographer aims at the person's face through a viewfinder, confirms the apparent size of the person's head while determining the subject distance by manual adjustment during observation, and photographs the image. The size of the photograph is regulated by using a cutter for cutting margins of the portrait, so as to obtain the ID portrait of a predetermined size appropriate to the particular format designed by the issuer of the ID.

However, as a practical matter, human head images on ID portraits vary in size. The use of portraits on ID articles such as passports, in which the portraits need to be carefully safeguarded against unlawful alteration, requires a more exact regulation of the image size. The image of the head should be desirably sized in the portrait, namely according to an exact composition. Let A be the width of the margin between the top of the image of the head and the upper edge of the portrait. Let B be the vertical extent of the head image, and let C be the horizontal distance between the center of the head image and the left edge of the portrait (see FIG. 4). The dimensions A, B and C are to fall within respective acceptable ranges, from AMIN to AMAX, from BMIN to BMAX, and from CMIN to CMAX.

However, it is extremely difficult with the conventional ID portrait cameras to make a portrait of a human head even within an acceptable range because the apparent size of the head and the subject distance are determined only by manual adjustment during observation. It is more difficult to reproduce the image of a head in the designated layout or composition only by adjusting the orientation of the camera manually.

OBJECT OF THE INVENTION

In view of the foregoing problems, an object of the present invention is to provide a portrait photography camera and method easily capable of making a portrait wherein a human head is reproduced in the portrait according to a particular composition and size as designated.

SUMMARY OF THE INVENTION

In order to achieve the above and other objects and advantages of this invention, a viewfinder is adapted to observe the subject. First index means are disposed within a field frame of the viewfinder, and are adapted to frame the subject by referring to the first index means. The subject as framed is photographed so as to create an image having an appropriate predetermined size range and composition on the film.

In a preferred embodiment, a converter lens is selectively mounted on the taking lens assembly, the combination of the taking lens with the converter lens having a second focal length different from the first focal length of the taking lens. Second index means is indicated within the field frame of the viewfinder and is adapted to frame a human head. The human head as framed is photographed through the first converter lens so as to create on the film an image having a range of size similar to the predetermined range.

In a conventional system in which portraits are printed from negative film, it would be possible to obtain a portrait having a human head image of a designated size by adjusting the printing magnification. However, as human head images on negative film vary in size, the printing magnification must be correspondingly adjusted, and this complicates the reproduction operation. In the present invention, by contrast, a portrait can be easily photographed wherein a human head image is reproduced on the portrait according to a particular predetermined composition.

BRIEF DESCRIPTION OF THE DRAWINGS

The above objects and advantages of the present invention will become more apparent from the following detailed description when read in connection with the accompanying drawings, in which:

FIG. 6 is an exploded perspective view illustrating another preferred camera, for use with attachable converter lenses;

DETAILED DESCRIPTION OF THE PREFERRED EMBODIMENTS OF THE PRESENT INVENTION

Figure 1:
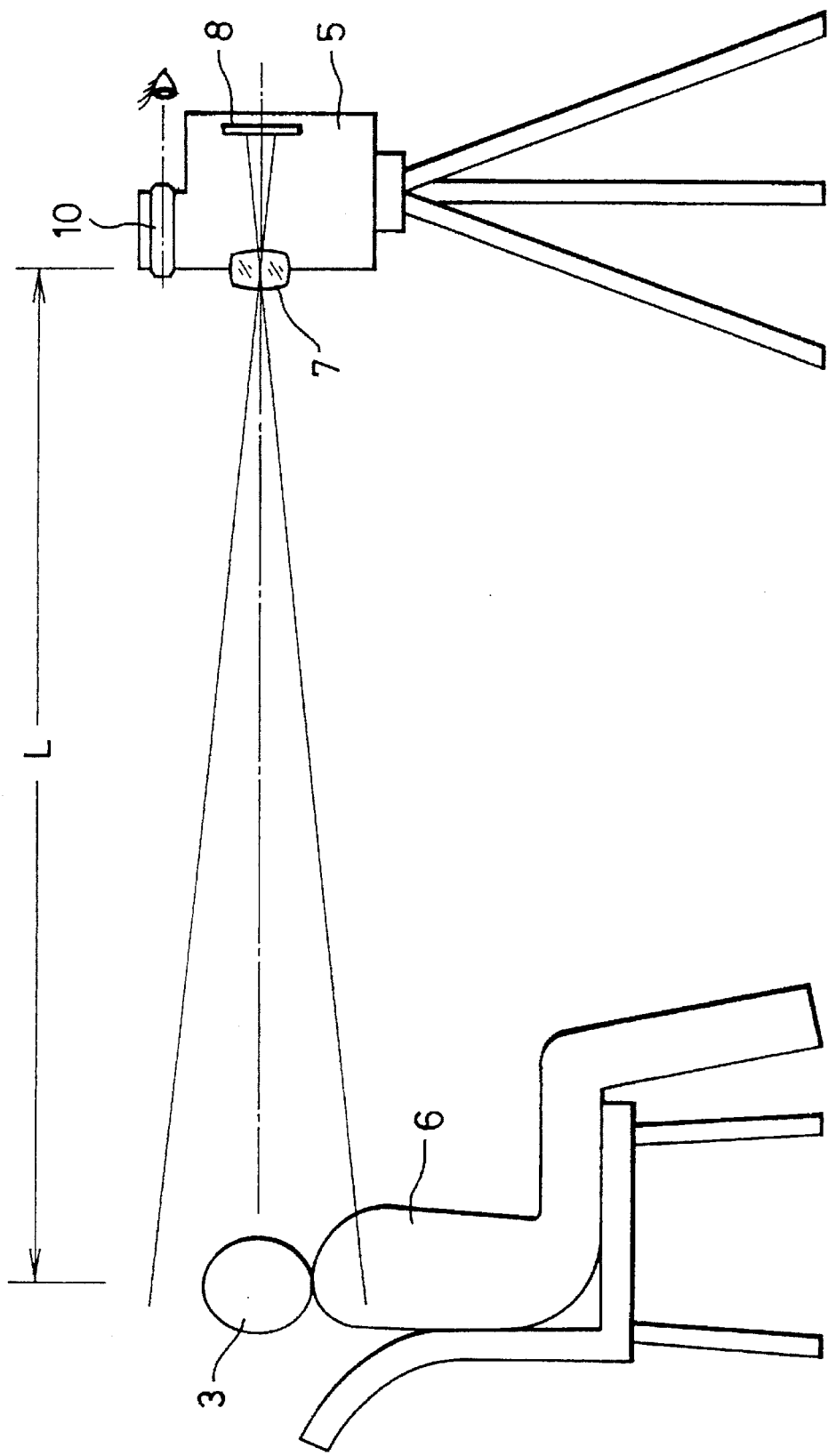
FIG. 1 is an explanatory view generally illustrating a camera according to the invention and a human head to be photographed by it.
Figure 4:
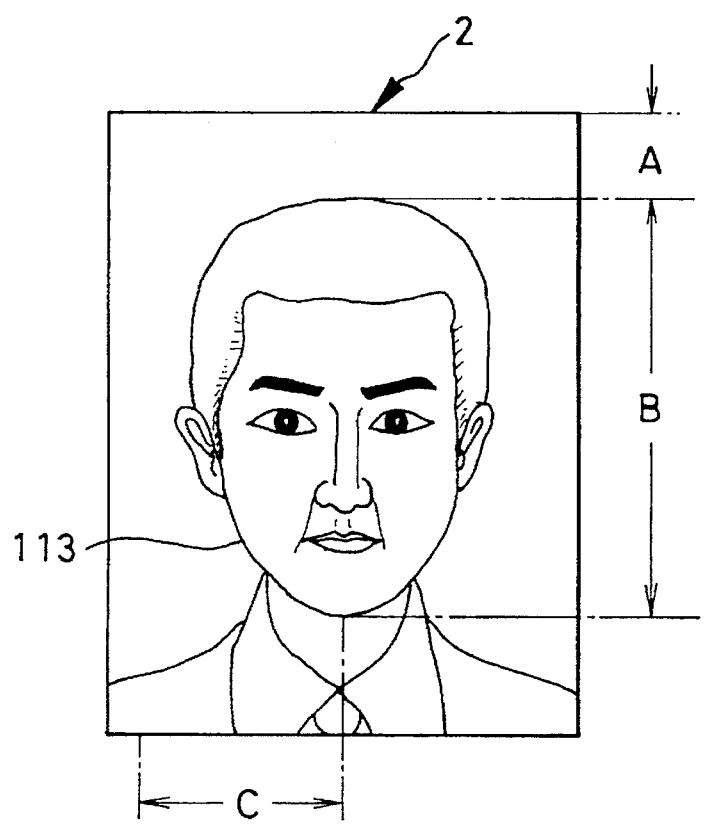
FIG. 4 is an explanatory view illustrating a portrait made with the novel camera.

FIG. 1 illustrates the making of a portrait of a person 6 with camera 5 according to the invention. A taking lens 7 has a fixed focal length. When a subject distance L is in the range from LMIN to LMAX and the human head 3 of an ordinary size; the camera 5 photographs the human head 3 in such a manner that sizes A, B and C as illustrated in FIG. 4 lie within acceptable ranges. To record the image, the camera 5 is used with an instant film unit 8 of a peel-apart type known per se. After exposure, the film unit 8 is pulled from between a pair of developing rollers. Processing solution is automatically applied during the pulling of the film. 8. Upon a photo-sensitive sheet of the film unit being peeled away from a receiving sheet, a portrait is obtained having a human head image reproduced thereon.

Figure 2:
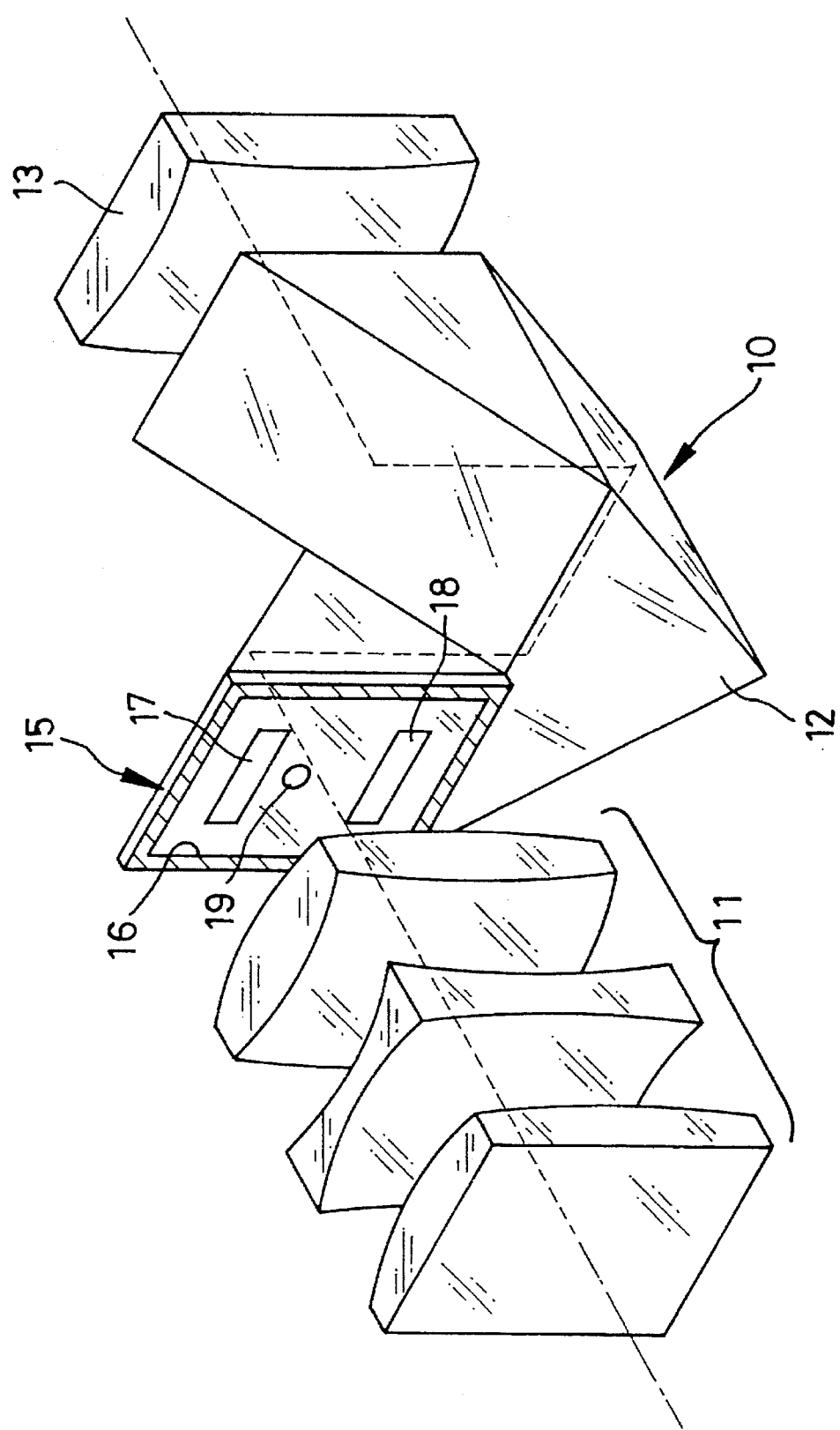
FIG. 2 is an exploded perspective view illustrating the construction of a viewfinder for use in the present invention.
Figure 3:
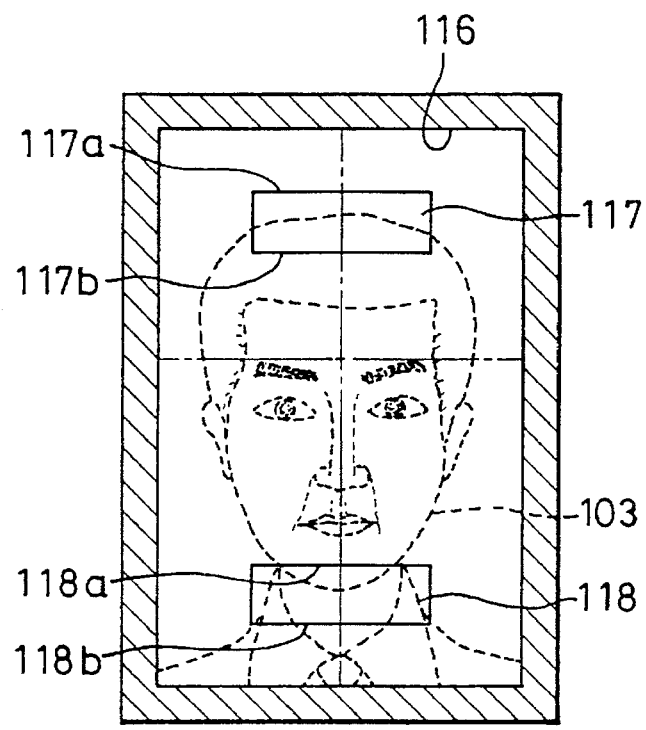
FIG. 3 is an explanatory view illustrating a field frame visible through the viewfinder.

A viewfinder 10 of the camera 5 is of the real-image type, and is structurally illustrated in FIG. 2. The viewfinder 10 is constituted of an objective lens 11 of a positive power, a Porro prism 12 for erecting the image, an eyepiece lens 13 of a positive power, and a reticle plate 15 arranged on an incident surface of the Porro prism 12. The reticle 15 consists of a transparent plate, e.g. of glass or acrylic resin, provided with a field frame 16 defined inside an opaque frame, and a pair of semi-transparent index marks 17 and 18, both formed by deposition or printing. Because the reticle 15 is positioned in the focal plane of the objective lens 11, observation of the human head 3 through the eyepiece 13, as illustrated in FIG. 3, is accompanied by recognition of images of the field frame 16 and the index marks 17 and 18 sharply focussed with the human head 3.

The positions of the index mark images 117 and 118, as seen through the viewfinder 10, correspond to positions in the focal plane of the taking lens 7 and are used for framing or targeting the human head 3, while laying it out well, namely fixing the composition by fixing the position and/or orientation and determining the size to be photographed. The positions of the index marks 17 and 18 on the reticle 15 are predetermined having consideration for the parallax of the viewfinder 10, the focal length of the taking lens 7, the designated subject distance L, and the average size of human heads.

The index marks 17 and 18 each have a vertical width. The human head 3 is so framed or targeted that the upper end of the head image 103, visible through the viewfinder 10, is located between the top and bottom edges 117a and 117b of the index mark 117, and that the lower end of the head image 103 is located between the top and bottom edges 118a and 118b of the index mark 118. This framing orientation keeps the sizes A and B of FIG. 4 within the acceptable ranges from AMIN to AMAX and from BMIN to BMAX. The vertical width of the index mark 117 constitutes an acceptable range for the upper end, the vertical width of the index mark 118 constitutes an acceptable range for the lower end. The ordinary size of the human head image 103 can be so ranged that it lies, when smallest, between the inside edges 118a and 117b, and, when largest, between the outside edges 117a and 118b.

To make a portrait, the human head image 103 is observed through the viewfinder 10 with the index marks 117 and 118 superposed thereon. The head image 103 is framed by the index marks 117 and 118 so as to make a portrait 2 in which a well-laid-out image is reproduced on the receiving sheet. If the top and/or the bottom of the human head image 103 deviates from the index marks 117 and/or 118, the subject distance L is adjusted by moving the camera 5, so as to cause both the top and the bottom of the human head image 103 to underlie the index marks 117 and 118. The human head 3 having the ordinary size, adjustment of the subject distance L is such as to keep it in the range from LMIN to LMAX. It is naturally possible to adjust also the height of the camera 5 or the chair which the person 6 sits on, for adjustment of vertical deviation of the image 103. There may be formed an auxiliary central index mark 19 in correspondence with the nose of the person 6, for the purpose of properly positioning the viewfinder 10 relative to the horizontal.

The sizes A, B and C, shown on FIG. 4, are thus limited within acceptable ranges so that the reproduced image 113 is well laid out according to the predetermined composition, both in position and in size. Should the reproduced image 113 have such a predetermined size but is not positioned as predetermined, the composition of the image 113 can be adjusted by using a cutter to cut the margins of the portrait. However, the index marks 117 and 118 of the present invention enable the photographer to frame or target the head image 113 according to the particular composition both as to position and as to size, so that the margins of portraits similarly made can be cut away the same.

Figure 5A:
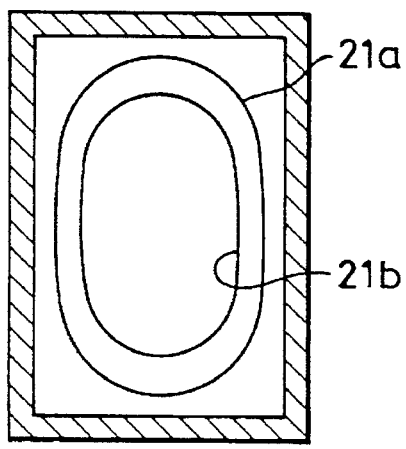
FIGS. 5A to 5D are explanatory views illustrating other embodiments of a field frame.
Figure 5B:
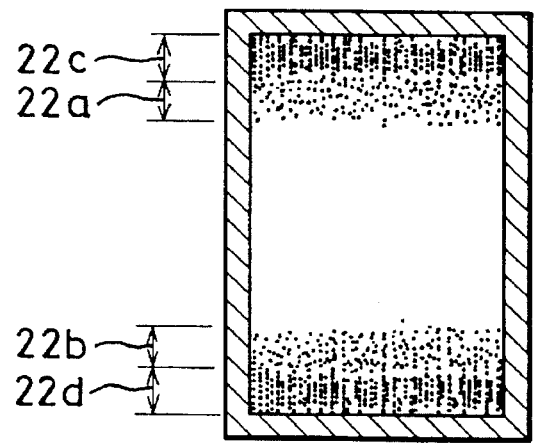

FIGS. 5A to 5D illustrate alternative indices that may be displayed in the field frame. In FIG. 5A, contour lines 21a and 21b are so positioned that the contour of the image 113 is located between the contour lines 21a and 21b, at least relative to the vertical direction. The doughnut-shaped area between the liens 21a and 21b may be colored as a semi-transparency, for convenience. As seen in FIG. 5A, the indicium is an oval, the height of the oval being greater than the width of the oval, the oval having a height and width less than the height and width of the field frame. In FIG. 5B, zones 22a and 22b are light-colored and semi-transparent, with zones 22c and 22d deeply colored but still semi-transparent. The acceptable positions of the top and the bottom of the image 113 are indicated by use of the zones 22a and 22b. Instead of differentiated density of color, zones can e separated by different colors which are semi-transparent.

Figure 5C:
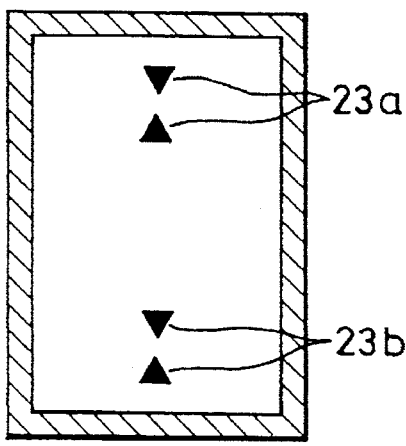
Figure 5D:
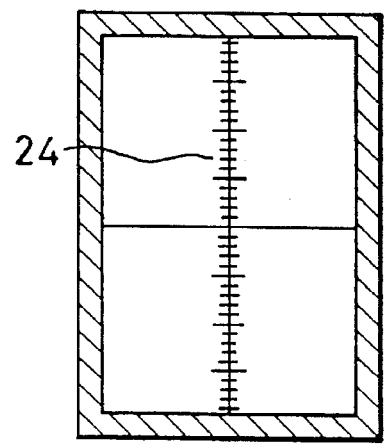

In FIG. 5C, pairs of triangular dots 23a and 23b are adapted to limit the framing of image 113. As seen in FIG. 5C, the indicia thus comprise two spaced dots 23a above the center of one field frame and two spaced dots 23b below the center of the field frame, each pair of dots making triangular spaces adjacent each other and triangular bases remote from each other. The distance between the pair of dots 23a and the pair of dots 23b is greater than the distance between the dots of the pair 23a or the distance between the dots of the pair 23b. In FIG. 5D, a horizontal line is provided with a scale 24 to serve as a reference for framing. The acceptable ranges can preferably be indicated by coloring at the relevant positions, like the dots 23a and 23b. As seen in FIG. 5D, the graduations of the scale 24 are equally spaced apart vertically therealong and of different horizontal lengths, the graduations of greater horizontal length being spaced apart by a plurality of graduations of a shorter length.

FIG. 6 illustrates another preferred embodiment of camera for portrait photography. A fixed taking lens assembly 26 is combinable with detachable wide-angle and telephoto converter lenses 27 and 28, permitting the focal length to be changed in three steps. For the standard subject distance from LMIN to LMAX, the film unit 8 is exposed through only the taking lens 26. The image 113 is well laid out in the portrait 2, so that the position and size are within acceptable ranges.

When the wide-angle converter 27 is added in combination with the lens assembly 26, the focal length is shortened. With the wide-angle converter 27, the image 3 is photographed at a subject distance LW which is still shorter than LMIN i.e. the lower limit of the subject distance for photography without either converter, so that the image 113 is again laid out in the acceptable range on the portrait. This is favorable when photographing the same human head which is unavoidably located somewhat farther from the camera.

As the image 113 can be laid out in the acceptable range, there are upper and lower limits between which LW is tolerable.

When the telephoto converter 28 is mounted on the camera in combination with the lens assembly 26, the focal length is lengthened. With the telephoto converter 28, the image 3 is photographed at a subject distance LT which is longer than LMAX, i.e., the upper limit of the subject distance for photography without either converter, so that the image 113 is laid out in the acceptable range on the portrait. This is favorable when photographing the same human head which is unavoidably located somewhat nearer the camera. As the image 113 can be laid out in the acceptable range, there are upper and lower limits between which LT is tolerable.

The camera 25 incorporates a rangefinding device 30 of an active type. Through a projector window 30a, a rangefinding beam is projected to the photographic subject. The rangefinding beam reflected from the subject is received through a receiver window 30b. According to the beam received, a detection is made, in a lamp selector 43, whether the subject distance is within the standard range between LMIN and LMAX, within the wide-angle range below LMIN, or within the telephoto range above LMAX.

Figure 7:
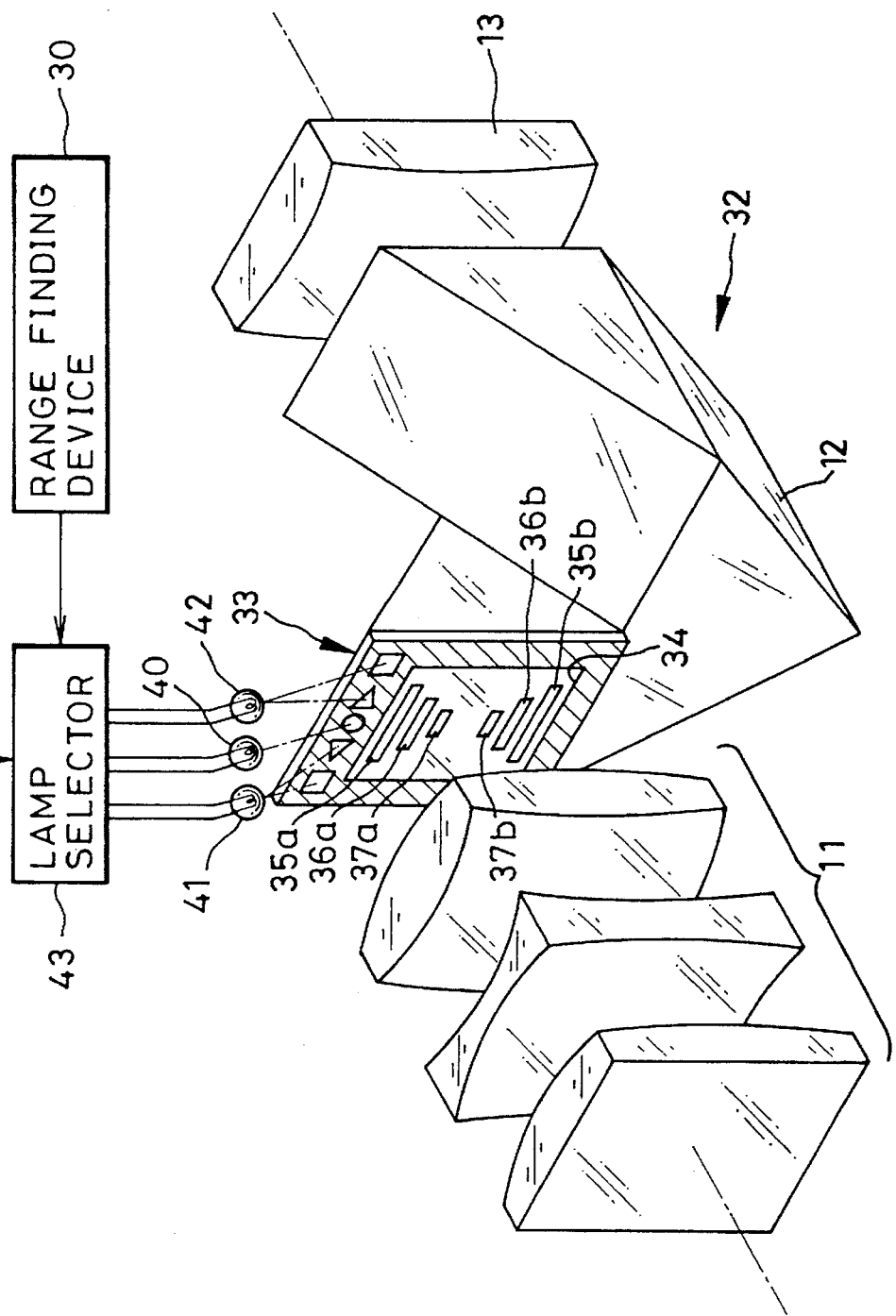
FIG. 7 is an exploded perspective view illustrating the construction of the viewfinder.
Figure 8:
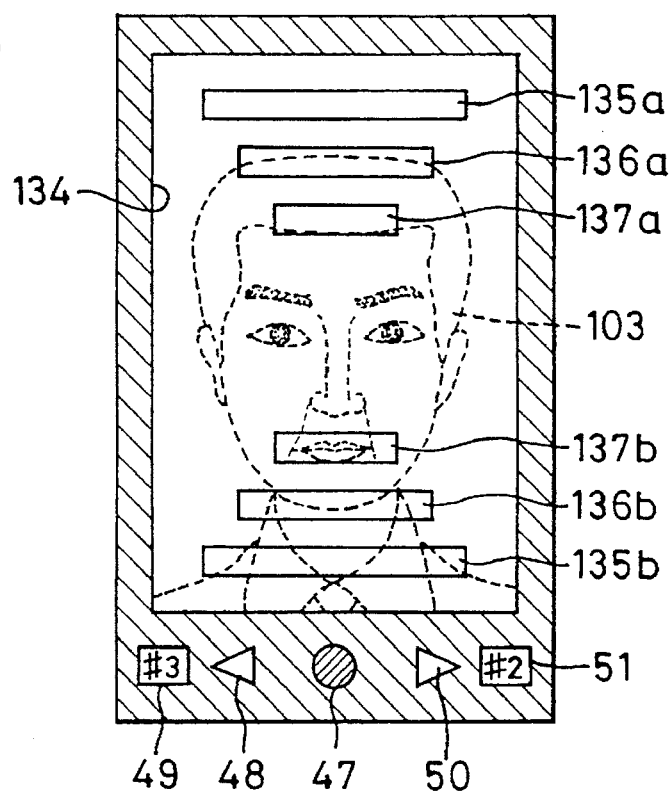
FIG. 8 is an explanatory view illustrating a field frame visible through the viewfinder.

A viewfinder 32 is of the real-image type and is illustrated in FIG. 7. The viewfinder 32 has a reticle 33 different from the reticle 15 of the former viewfinder 10. The reticle 33 is provided with a field frame 34, and three pairs of semi-transparent index marks 35a, 35b, 36a, 36b, 37a and 37b. As illustrated in FIG. 8, the positions of index mark images 135a, 135b, 136a, 136b, 137a and 137b are seen through the viewfinder 32 along with a field frame image 134, and are used for framing the human head 3, while fixing the position and determining the size to be photographed. The human head 3 is so framed that the top of the head image 103, visible through the viewfinder 32, is located between respective pairs of horizontal edges of the index marks 135a, 136a or 137a, and that the bottom of the head image 103 is located between respective pairs of horizontal edges of the index marks 135b, 136b or 137b. The vertical width of the index marks 135a, 136a and 137a constitutes an acceptable range of the top, the vertical width of the index marks 135b, 136b and 137b constituting an acceptable range of the bottom.

Figure 9:
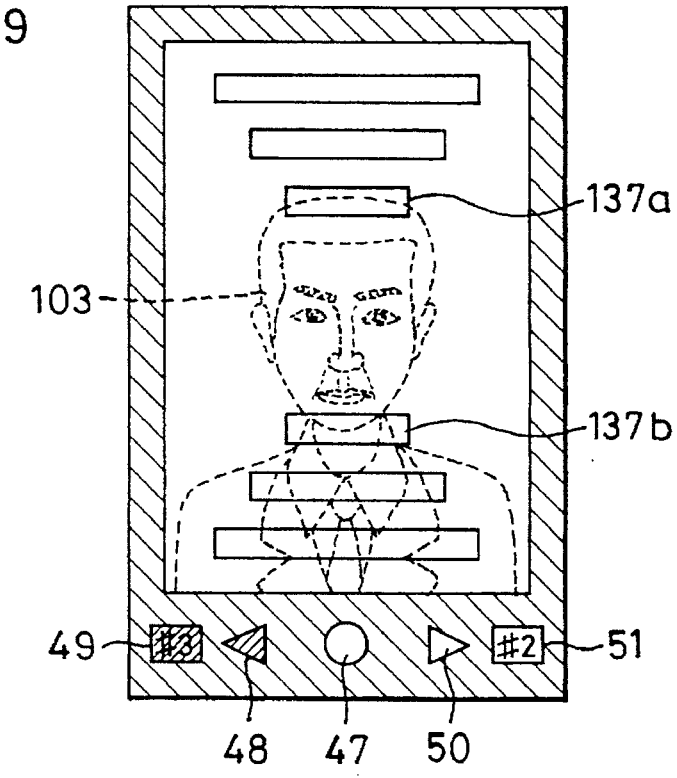
FIG. 9 is an explanatory view illustrating a field frame as in FIG. 8 but wherein the head to be photographed is farther from the camera than in FIG. 8.

Under the field frame 34 are arranged one round window 47, two triangular windows 48 and 50, and two square windows 49 and 51, as illustrated in FIGS. 8 and 9. Three indicator lamps 40, 41 and 42 are selectively actuated to indicate information by the windows 47 to 51 through the viewfinder 32. The lamp selector 43, for selective actuation of the indicator lamps 40 to 42, is supplied with a distance signal generated from the rangefinding device 30, and a converter-mounted signal generated from a converter detecting switch 31 operable when pressed by projections 27a and 28a. The output of the converter detecting switch 31 represents any of three states: the presence of the wide-angle converter 27, the presence of the telephoto converter 28, and the absence of any converter on the taking lens 26.

When the subject distance of the human head 3 is in the standard range from LMIN to LMAX, the human head 3 is photographed through the taking lens 26 without either converter 27 or 28. As illustrated in FIG. 8, the human head 3 is so observed and framed that the top and bottom of the human head image 103 lap the index mark images 136a and 136b. According to a distance signal from the rangefinding device 30, it is detected that the human head 3 is in the standard range of the subject distance. The converter detecting switch 31 does not supply the lamp selector 43 with any signal that a converter is mounted. Then the lamp selector 43 actuates the standard lamp 40 for continuous illumination, to indicate through the round window 47 the information that the camera is ready for photography at the standard focal length.

When the subject distance L of the head 3 is LT farther than the standard range, the head 3 is observed to have an apparently small size, as illustrated in FIG. 9. According to a distance signal from the rangefinding device 30, it is detected that the head 3 is in the telephoto range of the subject distance. No converter 27 or 28 being mounted on the camera 25, the converter detecting switch 31 does not supply the lamp selector 43 with any signal that a converter is mounted. Detection of the telephoto range despite the lack of a converter-mounted signal causes the lamp selector 43 to actuate the telephoto lamp 42 to blink, to indicate through the windows 48 and 49 the information of requirement for mounting the telephoto converter 28, of which the numeral appears in the window 49.

When the telephoto converter 28 is mounted on the camera 25, the switch 31 is operated by the projection 28a and supplies the lamp selector 43 with a "telephoto-mounted" signal, in response to which the telephoto lamp 42 is continuously driven. The photographer will then be advised of the telephoto mode with the telephoto converter 28.

The index mark images 137a and 137b are used for framing the image 103. Due to the extra subject distance LT, the top and bottom of the head image 103 are located nearly in the widthwise middle of the index marks 137a and 137b, as illustrated in FIG. 9. Even if the subject distance were slightly different, there would be no problem when the top and bottom of the head image 103 are located within the index marks 137a and 137b.

But when the telephoto converter 28 is mounted on the camera, the image 103 as recorded on the film unit 8 is magnified to what is illustrated in FIG. 4, despite the apparently unchanged size visible through the field frame 34. Targeting through the viewfinder 32 within the field frame 34 is adjusted by using the index mark image 137a and 137b corresponding to the telephoto converter 28, so that the sizes A, B and C of FIG. 4 are kept within the acceptable ranges. If the top and bottom of the image 103 are slightly outside the index marks 137a and 137b, the distance of the camera 25 to the photographic subject can be adjusted correspondingly to locate the top and bottom of the image 103 within the index marks 137a and 137b.

When the subject distance L is short by an increment LW, the wide-angle lamp 41 is repetitively driven until the wide-angle converter 27 is mounted on the camera. The windows 50 and 51 are repetitively illuminated, in the latter of which the numeral of the wide-angle converter 51 appears. When the wide-angle converter 27 is mounted on the camera 25, the switch 31 is operated by the projection 27a and supplies the lamp selector 43 with a "wide-angle-mounted" signal, in response to which the wide-angle lamp 41 is continuously driven. Now the index marks 135a and 135b are used for framing the head image 103. Due to the shortfall LW of the subject distance, the top and bottom of the head image 103 are located nearly in the widthwise middle of the index marks 135a and 135b. Even if the subject distance is slightly different from that corresponding to LW, there is no problem when the top and bottom o the head image 103 are located within the index marks 135a and 135b. Again, if the top and bottom of the human head image 103 are slightly outside the index marks 135a and 135b, the distance of the camera 25 to the photographic subject can be adjusted correspondingly to locate the top and bottom of the head image 103 within the index marks 135a and 135b.

If either converter lens is mounted on the camera when the subject is in the standard range, the standard lamp 40 is driven repetitively so as to require the photographer to dismount the converter from the camera 25. Then the photographer can take a portrait through the taking lens 26, without the attachment of either converter.

This construction is advantageous for the selection of the indicator lamps after combination of the signals from the rangefinding device 30 and from the converter detecting switch 31, in order to confirm an appropriate selection of a focal length in correspondence with the subject distance. The index mark images corresponding to the focal length as selected are visually selected through the viewfinder 32 so as to frame the human head image for good position and size of reproduction. Therefore, the novel construction is highly advantageous in cases wherein the subject distance is unavoidably unchangeable except by minute adjustments. Note that the three pairs of index mark images 135a, 135b, 136a, 136b, 137a and 137b may be constructed such that they are invisible but that the appropriate one of the three pairs can be made visible in response to a combination of the signals from the rangefinding device 30 and the converter detecting switch 31.

Note that, although the above embodiment relates to viewfinders of a real-image type, the present invention is applicable to viewfinders of other types, e.g. inverted Galilean viewfinders of either an Albada type or a bright frame type. Although the index mark images are indicated by coloring the reticle plate semi-transparently, index mark images can be electrically indicated, e.g. by the use of liquid crystal display panels or light-emitting diodes incorporated in the viewfinder. Although an instant film unit can be used in an instant camera, the present invention is applicable also to photographic cameras in which general purpose negative film can be used. It is to be noted that, unlike instant film units in which the reproduced size of the image is dependent only on the photographic magnification, the size of the image reproduced by means of negative film is dependent not only on the photographic magnification but also on magnification during printing.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A method of photographing a photographic subject on a photographic film by use of a camera having a taking lens assembly, means for selectively imparting to said taking lens assembly a first focal length or a second focal length, a viewfinder for observing said subject, first indicia within a field frame of said viewfinder and adapted to frame said subject by referring to said first indicia, second indicia within said field frame of said viewfinder and adapted to frame said subject by referring to said second indicia, said first and second indicia being disposed one outside the other within said field frame such that said subject has two distinctively different sizes in said field frame as viewed by a user of the camera, depending on whether said subject is framed with reference to said first indicia or with reference to said second indicia, and a rangefinder for measuring the distance from said camera to said subject to generate a distance signal; the method comprising displaying in said viewfinder an instruction to said user, responsive to said distance signal, to frame said subject by referring to one of said first and second indicia such that said subject as framed will be photographed so as to create an image having an appropriate predetermined size range on said film, framing the subject in accordance with said instruction, and exposing said film with the subject thus framed, the height of the field frame being greater than the width of the field frame, and said indicia being an oval, the height of the oval being greater than the width of the oval, the oval having a height and width less than the height and width of said field frame.

2. A method as defined in claim 1, and changing the focal length of said lens assembly in accordance with said distance signal.

3. A method as defined in claim 2, wherein said change of the focal length of said lens assembly is effected with at least one converter lens selectively positionable along and removable from an optical axis of said taking lens assembly.

* * * * *